United States Patent
Shin et al.

(10) Patent No.: US 10,953,757 B2
(45) Date of Patent: Mar. 23, 2021

(54) INTERLEAVED HYBRID SWITCH NETWORK OF GROUND SIDE COILS FOR DYNAMIC WIRELESS POWER TRANSFER

(71) Applicant: Toyota Motor Engineering & Manufacturing North America, Inc., Erlanger, KY (US)

(72) Inventors: Jongwon Shin, Ann Arbor, MI (US); Jae Seung Lee, Ann Arbor, MI (US); Chung Chih Chou, Ann Arbor, MI (US); George C. Bucsan, Belleville, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 501 days.

(21) Appl. No.: 15/862,551

(22) Filed: Jan. 4, 2018

(65) Prior Publication Data
US 2019/0202298 A1 Jul. 4, 2019

(51) Int. Cl.
*B60L 9/00* (2019.01)
*H02J 50/10* (2016.01)
*H02J 50/40* (2016.01)

(52) U.S. Cl.
CPC ............... *B60L 9/00* (2013.01); *H02J 50/10* (2016.02); *H02J 50/40* (2016.02);
(Continued)

(58) Field of Classification Search
CPC ... B60L 9/00; B60L 50/53; H02J 50/10; H02J 50/40
(Continued)

(56) References Cited

U.S. PATENT DOCUMENTS

| 4,185,561 A * | 1/1980 | Reymann | A63H 19/32 |
| | | | 104/302 |
| 8,684,150 B2 * | 4/2014 | Kumar | B60M 3/00 |
| | | | 191/2 |

(Continued)

FOREIGN PATENT DOCUMENTS

WO 2016179329 11/2016

OTHER PUBLICATIONS

Suh et al.; "Electric Vehicle On-Road Dynamic Charging System with Wireless Power Transfer Technology"; IEEE, 2013, pp. 234-240 (7 pages).
(Continued)

*Primary Examiner* — Jason C Smith
(74) *Attorney, Agent, or Firm* — Snell & Wilmer LLP

(57) ABSTRACT

Methods, systems, and apparatus for wirelessly providing power to a vehicle. The system includes a plurality of ground-side wireless power transfer devices each configured to automatically provide power to a counterpart vehicle-side wireless power transfer device. The system includes a switch connecting a power source to the plurality of ground-side wireless power transfer devices and configured to be in an open position or a closed position. The system includes a vehicle position sensor configured to detect the vehicle being within a range of the plurality of ground-side wireless power transfer devices. The system includes a switch driver configured to move the switch from the open position to the closed position when the vehicle position sensor detects the vehicle being within the range, and move the switch from the closed position to the open position when the vehicle position sensor does not detect the vehicle being within the range.

19 Claims, 8 Drawing Sheets

(52) U.S. Cl.
CPC ....... *B60L 2210/30* (2013.01); *B60L 2240/62* (2013.01); *B60L 2240/70* (2013.01)

(58) Field of Classification Search
USPC .......................................................... 191/2
See application file for complete search history.

(56) References Cited

U.S. PATENT DOCUMENTS

| | | | | |
|---|---|---|---|---|
| 8,827,058 | B2* | 9/2014 | Vollenwyder | B60L 53/12 191/10 |
| 2011/0163542 | A1* | 7/2011 | Farkas | B60L 53/126 290/2 |
| 2013/0154553 | A1* | 6/2013 | Steele | B60M 7/003 320/108 |
| 2016/0065079 | A1* | 3/2016 | Bai | B60L 53/122 363/21.01 |
| 2017/0136908 | A1* | 5/2017 | Ricci | B60L 53/126 |
| 2019/0202298 | A1* | 7/2019 | Shin | H02J 50/10 |

OTHER PUBLICATIONS

Shin et al.; "Design and Implementation of Shaped Magnetic-Resonance-Based Wireless Power Transfer System for Roadway-Powered Moving Electric Vehicles"; IEEE Transactions on Industrial Electronics, vol. 61, No. 3, Mar. 2014, pp. 1179-1192 (14 pages).

Miller et al.; "ORNL Experiece and Challenges Facing Dynamic Wireless Power Charging of EV's"; IEEE Circuits and Systems Magazine, 2015, pp. 40-53 (14 pages).

Miller et al.; "Primary-Side Power Flow Control of Wireless Power Transfer for Electric Vehicle Charging"; IEEE Journal of Emerging and Selected Topics in Power Electronics, vol. 3, No. 1, Mar. 2015, pp. 147-162 (16 pages).

Li et al.; "Wireless Power Transfer for Electric Vehicle Applications"; IEEE journal of Emerging and Selected Topics in Power Electronics, vol. 3, No. 1, Mar. 2015, pp. 4-17 (14 pages).

Ko et al.; "The Optimal System Design of the Online Electric Vehicle Utilizing Wireless Power Transmission Technology", IEEE Transactions on Intelligent Transportation Systems, vol. 14, No. 3, Sep. 2013, pp. 1255-1265 (11 pages).

Kim et al.; "Coil Design and Shielding methods for a Magnectic Resonant Wireless Power Transfer System"; Proceeding of the IEEE, vol. 101, No. 6, Jun. 2013, pp. 1332-1342 (11 pages).

Huh et al.; "Narrow-Width Inductive Power Transfer System for Online Electrical Vehicles"; IEEE Transactions on Power Electronics, vol. 26, No. 12, Dec. 2011, pp. 3666-3679 (14 pages).

Chris Mi et al; "Modern Advances in Wireless Power Transfer Systems for Roadway Powered Electric Vehicles"; IEEE Transactions on Industrial Electronics, vol. 63, No. 10, Oct. 2016, pp. 6533-6545 (13 pages).

Choi et al.; "Advances in Wireless Power Transfer Systems for Roadway-Powered Electric Vehicles"; IEEE Journal of Emerging and Selected Topics in Power Electronics, vol. 3, No. 1, Mar. 201 5, pp. 18-36 (19 pages).

* cited by examiner

INTERLEAVED HYBRID SWITCH NETWORK OF GROUND SIDE COILS FOR DYNAMIC WIRELESS POWER TRANSFER

BACKGROUND

1. Field

This specification relates to a system and a method for wirelessly transferring power from a ground-side power source to a vehicle.

2. Description of the Related Art

Some vehicles may be fully electric or partially electric vehicles. These vehicles may store charge in one or more batteries onboard the vehicle. These batteries may take a significant amount of time to charge, and in some cases, may limit the appeal and usage of an electric vehicle. For example, if an electric vehicle has a range of 300 miles on a single charge, the operator of the electric vehicle must make a stop to charge the vehicle if the operator wishes to drive the vehicle more than 300 miles on a single trip. This aspect of electric vehicle operation may be unappealing to some people. In addition, batteries in an electric vehicle may represent a significant portion of the cost and weight associated with a vehicle.

Dynamic wireless power transfer attempts to transmit electrical power to an electric vehicle while the vehicle is moving. However, these systems have significant cost and efficiency shortcomings. Accordingly, there is a need for a cost effective and efficient system where electric vehicles are less reliant on batteries to store large amounts of electrical power.

SUMMARY

What is described is a system for wirelessly providing power to a vehicle. The system includes a plurality of ground-side wireless power transfer devices each having a coil and an impedance matching circuit, each ground-side wireless power transfer device configured to automatically provide power to a counterpart vehicle-side wireless power transfer device. The system also includes a switch connecting a power source to the plurality of ground-side wireless power transfer devices and configured to be in an open position or a closed position. The system also includes a vehicle position sensor configured to detect the vehicle being within a range of the plurality of ground-side wireless power transfer devices. The system also includes a switch driver connected to the vehicle position sensor and the switch and configured to move the switch from the open position to the closed position when the vehicle position sensor detects the vehicle being within the range of the plurality of ground-side wireless power transfer devices, and move the switch from the closed position to the open position when the vehicle position sensor does not detect the vehicle being within the range of the plurality of ground-side wireless power transfer devices.

Also described is a system for wirelessly providing power to a vehicle. The system includes a first plurality of ground-side wireless power transfer devices. The system also includes a second plurality of ground-side wireless power transfer devices, each ground-side wireless power transfer device from the first plurality of ground-side wireless power transfer devices and the second plurality of ground-side wireless power transfer devices having a coil and an impedance matching circuit and being configured to automatically provide power to a counterpart vehicle-side wireless power transfer device, the first plurality of ground-side wireless power transfer devices and the second plurality of ground-side wireless power transfer devices arranged in an interleaved pattern along a surface to be traversed by the vehicle. The system also includes a first switch connecting a power source to the first plurality of ground-side wireless power transfer devices and configured to be in an open position or a closed position. The system also includes a second switch connecting the power source to the second plurality of ground-side wireless power transfer devices and configured to be in an open position or a closed position. The system also includes a vehicle position sensor configured to detect the vehicle being within a range of the first plurality of ground-side wireless power transfer devices and the second plurality of ground-side wireless power transfer devices. The system also includes a switch driver. The switch driver is configured to move at least one of the first switch or the second switch from the open position to the closed position when the vehicle position sensor detects the vehicle being within the range of the first plurality of ground-side wireless power transfer devices and the second plurality of ground-side wireless power transfer devices. The switch driver is also configured to move at least one of the first switch or the second switch from the closed position to the open position when the vehicle position sensor does not detect the vehicle being within the range of the first plurality of ground-side wireless power transfer devices and the second plurality of ground-side wireless power transfer devices.

Also described is a method for wirelessly providing power to a vehicle. The method includes providing a plurality of ground-side wireless power transfer devices each having a coil and an impedance matching circuit, each ground-side wireless power transfer device configured to automatically provide power to a counterpart vehicle-side wireless power transfer device. The method also includes providing a switch connecting a power source to the plurality of ground-side wireless power transfer devices and configured to be in an open position or a closed position. The method also includes detecting, by a vehicle position sensor, the vehicle being within a range of the plurality of ground-side wireless power transfer devices. The method also includes moving, by a switch driver connected to the vehicle position sensor and the switch, the switch from the open position to the closed position when the vehicle position sensor detects the vehicle being within the range of the plurality of ground-side wireless power transfer devices, and moving the switch from the closed position to the open position when the vehicle position sensor does not detect the vehicle being within the range of the plurality of ground-side wireless power transfer devices.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1:
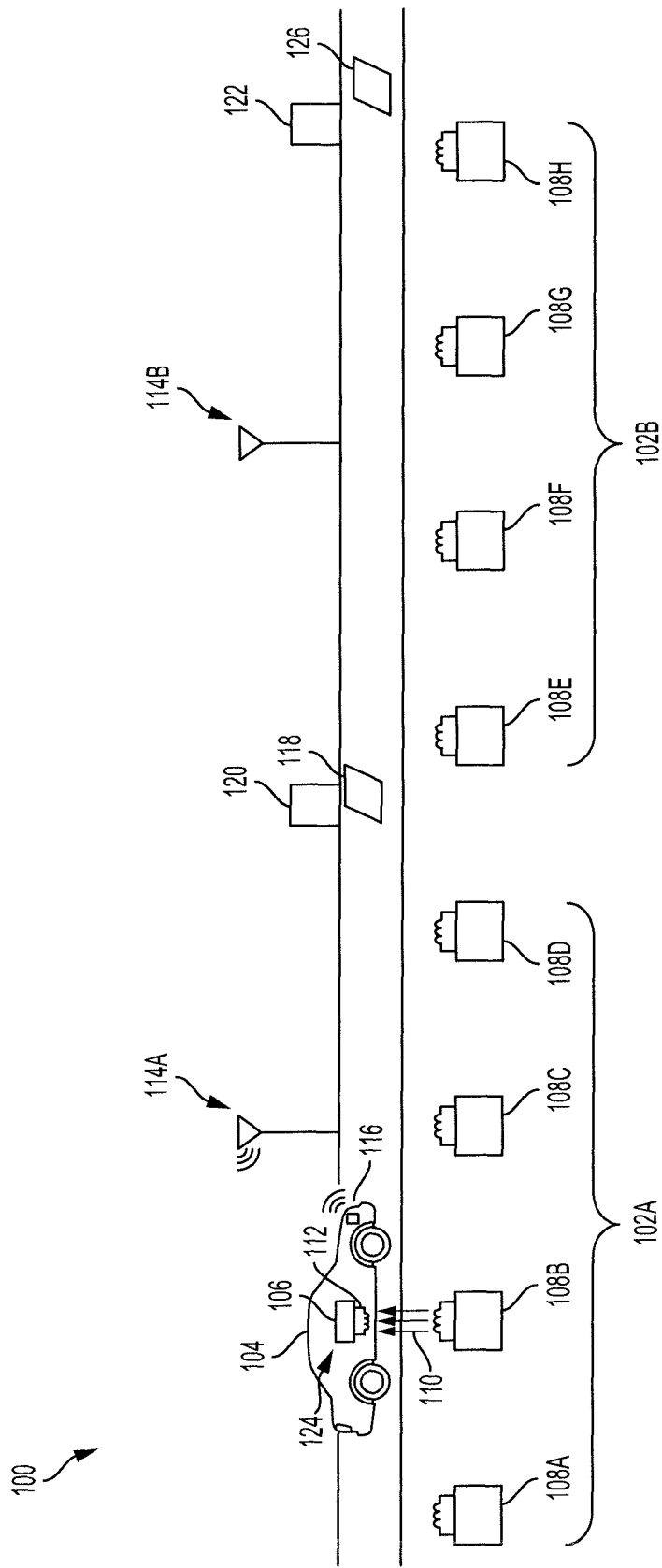
FIG. 1 illustrates an example situation of a vehicle using the interleaved hybrid switch dynamic wireless power transfer system, according to various embodiments of the invention.

Disclosed herein are systems, vehicles, and methods for automatically providing electrical power to an electrical vehicle via a wireless power transfer system. Dynamic wireless power transfer (DWPT) refers to the technology of transferring energy to a moving vehicle. The transferred energy may be used to power the vehicle directly, or to charge an energy storage device onboard the vehicle, such as a battery. DWPT reduces or eliminates the range anxiety associated with operating and owning an electric vehicle. DWPT also may reduce the weight or the cost of the vehicle by allowing for reduced sizes of energy storage devices onboard the vehicle.

A significant obstacle for implementation of DWPT is a high system cost of the ground-side power architecture. Conventionally, the ground-side power architecture either required many components, rendering it expensive to build and maintain, or was not efficient in power usage, rendering it expensive to operate. The systems and methods disclosed herein provide an improved ground-side power system with fewer parts than conventional systems, and more efficient operations as compared to conventional systems.

To properly and efficiently power the ground-side coils, sensors and switches may be used to turn on and off the individual transmitter coils. However, sensors and switches have high cost, so use of fewer sensors and switches is preferable and desirable.

The system described herein is a combination of a switch controlled system and an automatic power transfer system. The combination reduces the collective inefficiencies and drawbacks of using only a switch controlled system or using only an automatic power transfer system, resulting in a cost-effective, easily maintainable, and operationally efficient system for dynamically powering electric vehicles.

The switches used in the interleaved hybrid switch dynamic wireless power transfer system control groups of coils instead of individual coils, and turns on the groups of coils based on the relative location of the vehicle. When a particular group of coils is turned on, they do not transmit electrical power until they are automatically coupled with a vehicle-side coil using an impedance matching circuit. The system has many advantages over a switch controlled system or a switchless system. Compared to a switched system, the interleaved hybrid switch dynamic wireless power transfer system has a fewer number of switches, drivers, and sensors. Also, it is more energy efficient than a switched system because the current in each coil is automatically determined by magnetic coupling and only transmitted when the vehicle is present to receive the electrical power.

The sensors used in the interleaved hybrid switch dynamic wireless power transfer system may be more cost effective than sensors used in other systems because the sensors used in other systems may have higher sensitivity or accuracy or latency demands, as those sensors may be used to trigger individual coils. The sensors of the interleaved hybrid switch dynamic wireless power transfer system are used to trigger a group of coils, so sensitivity/accuracy/latency may not be as important.

FIG. 1 illustrates an example situation with a vehicle using the interleaved hybrid switch dynamic wireless power transfer system.

The vehicle 104 may be a fully or partially electric vehicle powered by a motor/generator. The vehicle 104 may store electrical energy in a battery for use by the motor/generator. The vehicle 104 may have an automatic or manual transmission. The vehicle 104 is a conveyance capable of transporting a person, an object, or a permanently or temporarily affixed apparatus. The vehicle 104 may be a self-propelled wheeled conveyance, such as a car, a sports utility vehicle, a truck, a bus, a van or other motor or battery driven vehicle. For example, the vehicle 104 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 104 may be a semi-autonomous vehicle or an autonomous vehicle. That is, the vehicle 104 may be self-maneuvering and navigate without human input. An autonomous vehicle may use one or more sensors and/or a navigation unit to drive autonomously.

The vehicle 104 may receive electrical power to be used to propel the vehicle 104 from ground-side wireless power transfer devices 108. The ground-side wireless power transfer devices 108 may be located on a road to be traversed by the vehicle 104 so that the vehicle 104 may be provided with electrical power as the vehicle 104 traverses the road. The electrical power may be used immediately by the motor/generator or any other component powered by electricity of the vehicle 104, or the electrical power may be stored in one or more batteries of the vehicle 104.

Generally, multiple segmented coils are preferable to a single elongated coil because the multiple segmented coils have a lower radiated electromagnetic interference (EMI) and a higher energy transfer efficiency.

When the vehicle 104 is in range of a set 102 of ground-side wireless power transfer devices 108, the vehicle 104 may receive electrical power from that particular set 102 of ground-side wireless power transfer devices 108. For example, as shown in FIG. 1, the vehicle 104 is within a range of the first set 102A of ground-side wireless power transfer devices 108A-108D, and may receive electrical power from any one of the ground-side wireless power transfer devices 108. As further shown in FIG. 1, the vehicle 104 is located above a ground-side wireless power transfer device 108B, and the ground-side wireless power transfer device 108B is providing electrical power to the vehicle-side wireless power transfer device 124.

The ground-side wireless power transfer device 108 may transfer electrical power automatically to the vehicle-side wireless power transfer device 124 using magnetic coupling 110. The ground-side wireless power transfer device 108 and the vehicle-side wireless power transfer device 124 may each have coils and power architectures configured to automatically determine the current in the ground-side coil and transmit electrical power from the ground-side wireless power transfer device 108 to the vehicle-side wireless power transfer device 124. For example, the vehicle-side wireless power transfer device 124 may have a coil 112 configured to receive the electrical power from a corresponding coil of the ground-side wireless power transfer device 108 and a vehicle-side power architecture 106 configured to process the electrical power received via the coil 112 for storage or use by the vehicle 104.

When the vehicle 104 is within a range of the first set 102A of ground-side wireless power transfer devices 108A-108D, all of the ground-side wireless power transfer devices 108A-108D in the first set 102A may be activated and ready to transmit electrical power to the vehicle 104. In some embodiments, the range is between 0.1 meters (m) and 10*m*. In some embodiments, a ground-side wireless power transfer device 108 is ready to transmit electrical power when electrical current is run through the ground-side wireless power transfer device 108. Accordingly, the ground-side wireless power transfer device 108 may be deactivated or not ready to transmit electrical power when electrical current is not being run through the ground-side wireless power transfer device 108.

In order to conserve electricity, a set 102 of ground-side wireless power transfer devices 108 may not be made ready to transfer electrical power until a vehicle 104 is detected as being within the range of the set 102. Accordingly, when no vehicle is detected as being within the range of the set 102, the set 102 of ground-side wireless power transfer devices 108 may be deactivated and unable to provide electrical power. By selectively activating and deactivating sets 102 of ground-side wireless power transfer devices 108, the system 100 conserves the electrical energy which would have been run through ground-side wireless power transfer devices 108 having no vehicle in range to potentially transmit electrical power to. For example, as shown in FIG. 1, the second set 102B of ground-side wireless power transfer devices 108E-108H may not have electrical current provided to them, as no vehicle is within the range of the second set 102B. By deactivating the second set 102B when no vehicle is within the range, electrical energy may be conserved.

The vehicle 104 may be detected as being within the range of a particular set of ground-side wireless power transfer devices in any number of active or passive ways, using a vehicle position sensor. The vehicle 104 may constantly transmit vehicle location data from a transceiver 116. The vehicle location data may indicate the location of the vehicle 104 in space. The vehicle position sensor may be an antenna 114 configured to receive the vehicle location data from the vehicle 104 and determine that the vehicle 104 is within the range of a particular set of ground-side wireless power transfer devices. For example, the vehicle 104 may have a transceiver 116 configured to transmit vehicle location data to be received by the vehicle position sensor (e.g., antenna 114A) on the side of the road. The vehicle position sensor may analyze the vehicle location data and determine that the vehicle 104 is located within the range of the first set 102A of ground-side wireless power transfer devices 108A-108D, and they may be activated so that electrical power may be provided to the vehicle 104 when the vehicle 104 drives over any ground-side wireless power transfer device 108 of the first set 102A of ground-side wireless power transfer devices 108A-108D.

In some embodiments, the vehicle position sensor may not be located within the range of its corresponding set of ground-side wireless power transfer devices 108, and may be located at a prior location along the road, such that when the vehicle position sensor detects the location of the vehicle 104, based on the speed of the vehicle 104 (which may be detected by the vehicle position sensor) the appropriate set of ground-side wireless power transfer devices may be later activated based on an anticipated arrival of the vehicle 104.

There may be one vehicle location sensor per set 102 of ground-side wireless power transfer devices 108. The vehicle 104 leaving the range of a set 102 of ground-side wireless power transfer devices 108 may be detected when the vehicle location sensor no longer receives vehicle position data from the vehicle transceiver 116 or when the vehicle position data received from the vehicle transceiver 116 indicates the vehicle 104 is no longer in the range of the set 102 of ground-side wireless power transfer devices 108. When the vehicle 104 leaves the range of the set 102 of ground-side wireless power transfer devices 108, the corresponding ground-side wireless power transfer devices 108 may be deactivated to conserve energy.

In some embodiments, the vehicle position sensor is an antenna 114 configured to receive vehicle position data, as described herein. In some embodiments, the vehicle position sensor is a weight sensor 118 configured to detect a vehicle 104 entering the range of a set 102 of ground-side wireless power transfer devices 108 based on a detected weight of the vehicle 104. A corresponding weight sensor 126 may be used to detect when the vehicle exits the range of the set 102 of ground-side wireless power transfer devices 108. When the vehicle 104 leaves the range of the set 102 of ground-side wireless power transfer devices 108, the corresponding ground-side wireless power transfer devices 108 may be deactivated to conserve energy.

In some embodiments, the vehicle position sensor is a movement detection sensor 120, such as RADAR or LIDAR, configured to detect when the vehicle 104 enters the range of a set 102 of ground-side wireless power transfer devices 108 based on movement of the vehicle 104. A corresponding location detection sensor 122 may be located at the end of the set 102 of ground-side wireless power transfer devices 108 to detect when the vehicle 104 leaves the range of the set 102 of ground-side wireless power transfer devices 108. When the vehicle 104 leaves the range of the set 102 of ground-side wireless power transfer devices 108, the corresponding ground-side wireless power transfer devices 108 may be deactivated to conserve energy.

In some embodiments, the vehicle position sensor includes a camera configured to detect image data, and the vehicle position sensor is configured to perform image processing to determine whether the vehicle 104 is in the range of a set 102 of ground-side wireless power transfer devices 108. The vehicle position sensor may use deep machine learning trained by a set of training images to learn to detect vehicles. In some embodiments, the vehicle position sensor is a computing device with a processor and a memory and configured to perform the functions described herein. The memory may be a non-transitory computer readable memory configured to store instructions for the processor of the vehicle position sensor.

Any combination of devices and methods for detecting the presence of the vehicle 104 in a range of a set 102 of ground-side wireless power transfer devices 108 may be used. For example, an antenna 114 may be used with a weight sensor 118, so that vehicles having a transceiver 116 can be detected and vehicles without a transceiver 116 may be detected as well.

The vehicle 104 may include one or more computers or electronic control units (ECUs), appropriately programmed, to control one or more operations of the vehicle 104, including providing vehicle location data to the transceiver 116.

A vehicle lacking vehicle-side wireless power transfer device 124 (e.g., a conventional internal combustion engine vehicle) may be unaffected by the presence of the ground-side wireless power transfer devices 108 underneath it.

Figure 2:
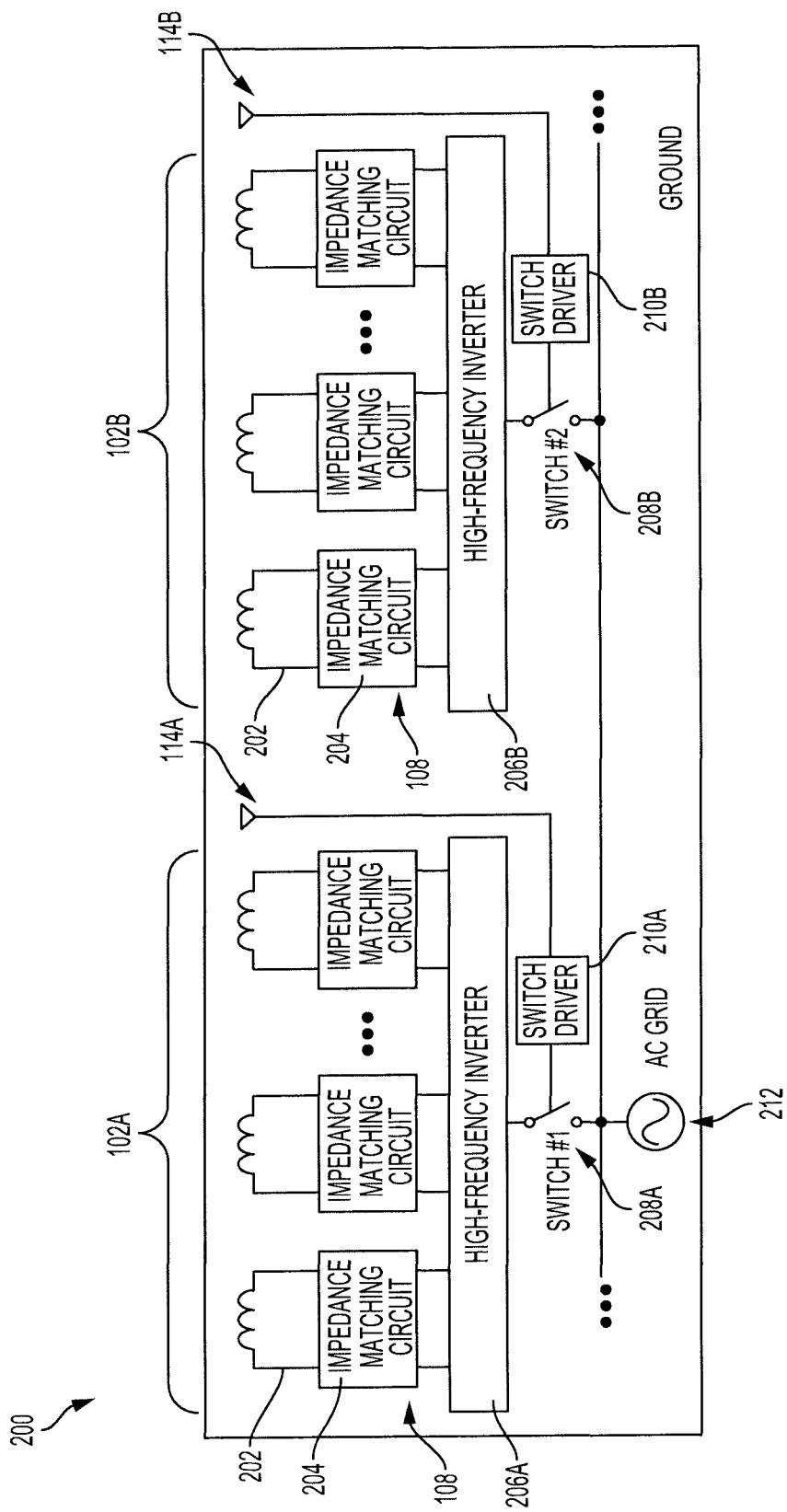
FIG. 2 illustrates an arrangement of the ground-side wireless power transfer devices within each set of two different sets, according to various embodiments of the invention.

FIG. 2 illustrates an arrangement 200 of the ground-side wireless power transfer devices 108 within the sets 102A and 102B.

The system described herein is a combination of a switched system approach and a switchless, automatic system approach. A switched system approach may include detection of a vehicle by a sensor, and turning on transmission of ground-side electrical power by a switch. These ground-side transmission systems may constantly emit electrical power via a coil while activated. These switched systems require many switches and sensors to individually turn coils on and off. A switchless system approach may include impedance matching circuits (a combination of inductors and capacitors) between a coil and the power source. A coupling of the vehicle-side coils and the ground-side coils automatically determines the current in the ground-side coil, and power transfer is achieved automatically, without a need for switches. However, with this switchless approach, a current is constantly run through the uncoupled ground-side coils, and contributes to conduction loss in the coil and degrades system efficiency. The system described herein uses impedance matching circuits and a reduced number of sensors and switches, as compared to a switched system approach, in order to maximize efficiency and minimize cost.

According to the arrangement 200, the ground-side wireless power transfer devices 108 of a set 102 are all connected to a single inverter 206. For example, the ground-side wireless power transfer devices 108 of the first set 102A are all connected to a first inverter 206A and the ground-side wireless power transfer devices 108 of the second set 102B are all connected to a second inverter 206B.

The inverter 206 is configured to convert low-frequency AC power (e.g., 50-60 Hz) received from an AC power source, such as an AC grid 212, into high-frequency AC power (e.g., 80 kHz) capable of being transmitted by the ground-side wireless power transfer devices 108. This generates the magnetic field between the ground-side coil 202 and the vehicle-side coil 112 to be coupled together. The high-frequency AC power is received by the vehicle-side coil 112, and the vehicle-side power architecture 106 is configured to convert the received high-frequency AC power into DC power to be stored by the battery of the vehicle 104. In some embodiments, the inverter 206 is a high-frequency inverter. The inverter 206 is connected to each of the ground-side wireless power transfer devices 108 in the particular set 102. The inverter 206 is also connected to a switch 208.

The switch 208 is configured to have an open state and a closed state. In the open state, the switch 208 disconnects the ground-side wireless power transfer devices 108 from the AC grid 212. In the closed state, the switch 208 connects the ground-side wireless power transfer devices 108 to the AC grid 212. The switch 208 may be a physical switch, such as a contactor, a relay, or a circuit breaker, or any kind of command or program that governs the operation(s) of the inverter.

The switch 208 is connected to a switch driver 210. The switch driver 210 is connected to the vehicle location sensor (illustrated as an antenna 114, but it may be any sensor, as described herein). When the vehicle location sensor detects a vehicle within the range of the set 102 of the ground-side wireless power transfer devices 108, the vehicle location sensor communicates a signal to the switch driver 210 to move the switch 208 from the open state to the closed state, to provide the ground-side wireless power transfer devices 108 with electrical power from the AC grid 212 (via the inverter 206).

In some embodiments, when the vehicle location sensor detects that the vehicle is no longer within the range of the set 102 of ground-side wireless power transfer devices 108, the vehicle location sensor communicates a signal to the switch driver 210 to move the switch 208 from the closed state to the open state, in order to conserve electrical energy when the ground-side wireless power transfer devices 108 are not being used.

In some embodiments, the switch driver 210 may automatically move the switch 208 from the closed state to the open state after a predetermined period of time has elapsed. In some embodiments, the switch driver 210 is communicatively coupled to the ground-side wireless power transfer devices 108, and the ground-side wireless power transfer devices 108 may be capable of detecting when they are transmitting electrical power to a vehicle. In these embodiments, when the ground-side wireless power transfer devices 108 indicate to the switch driver 210 that they are not transmitting electrical power to a vehicle, the switch driver 210 may move the switch 208 from the closed position to the open position.

The switch driver 210 may be a computing device with a processor and a memory and configured to perform the functions described herein. The memory may be a non-transitory computer readable memory configured to store instructions for the processor of the switch driver 210.

Each ground-side wireless power transfer device has a coil 202 and an impedance matching circuit 204. The impedance matching circuit 204 may be a combination of inductors and capacitors, which uses the reactance reflected by the receiver to automatically increase the field strength in coupled portions of the transmitter-receiver system, allowing for efficient power transfer. As a result, when a receiver (on the vehicle 104) and a transmitter (ground-side coil 202) are coupled by being in proximity to each other, the impedance matching circuit 204 allows for current to automatically be generated to facilitate providing of electrical power from the ground-side wireless power transfer device to the vehicle 104.

While an antenna 114 is shown in the drawings, any other device or sensor may be used to detect the presence of a vehicle within a range of the set 102 of ground-side wireless power transfer devices 108, such as a weight sensor 118 or a movement detection sensor 120 or a camera. The other device or sensor may be used instead of or in addition to the antenna 114.

In an example situation, a vehicle 104 equipped with a vehicle-side wireless power transfer device 124 is travelling down a road, approaching the first set 102A of ground-side wireless power transfer devices 108. The first vehicle location sensor (e.g., antenna 114A) detects the vehicle 104 and communicates an indication to the first switch driver 210A to move the first switch 208A from the open position to the closed position. The first switch 208A moves from the open position to the closed position, and electrical energy is provided from the AC grid 212 to the first inverter 206A, which converts low-frequency AC power to high-frequency AC power. The converted high-frequency AC power is then provided to the ground-side wireless power transfer devices 108. The ground-side wireless power transfer devices 108 automatically transfer electrical energy to the vehicle 104, as the vehicle 104 is travelling along the road, when the vehicle-side wireless power transfer device 124 is within a power transfer range of a ground-side wireless power transfer device 108 in the first set 102A. The vehicle-side wireless transfer device 124 receives the high-frequency AC power, converts the high-frequency AC power into DC power, and stores the DC power in a battery.

When the vehicle 104 is no longer in the range of the first set 102A of ground-side wireless power transfer devices 108, the first vehicle location sensor (e.g., antenna 114A) may detect this and alert the first switch driver 210A, which communicates an instruction to the first switch 208A to move from the closed state to the open state. In other embodiments, the first switch driver 210A may automatically communicate the instruction to the first switch 208A to move from the closed state to the open state after a period of time has elapsed.

The vehicle 104 may approach the second set 102B of ground-side wireless power transfer devices 108, and the process may repeat again, with the second vehicle location sensor (e.g., antenna 114B), the second switch driver 210B, the second switch 208B, and the second inverter 206B. The AC grid 212 providing the AC power to the ground-side wireless power transfer devices 108 of the first set 102A may be the same source or a different source than that of the second set 102B.

Figure 3A:
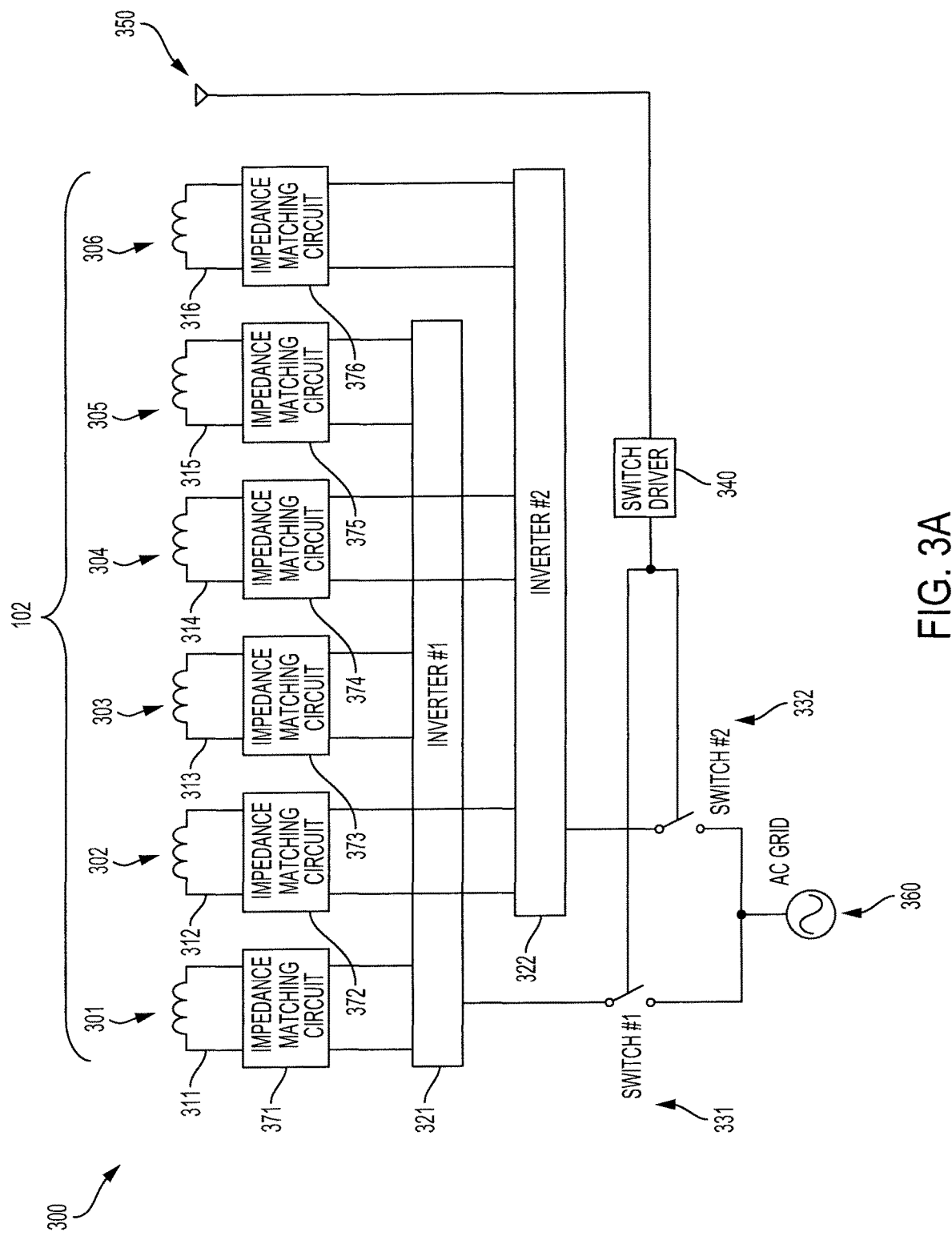
FIG. 3A illustrates an arrangement of the ground-side wireless power transfer devices of a particular set, according to various embodiments of the invention.

FIG. 3A illustrates an arrangement 300 of the ground-side wireless power transfer devices of a particular set 102. The ground-side wireless power transfer devices 301-306 each have a coil 311-316 and may each have an impedance matching circuit 371-376.

The ground-side wireless power transfer devices 301-306 (substantially similar to ground-side wireless power transfer devices 108) within a given set 102 may be arranged in different ways. As illustrated in FIG. 2, the ground-side wireless power transfer devices 301-306 of a particular set 102 may all be connected to a single common inverter. For example, in FIG. 2, the ground-side wireless power transfer devices 108 of the first set 102A are all connected to the first inverter 206A.

Alternatively, as shown in FIG. 3A, the ground-side wireless power transfer devices of a particular set 102 may be divided into two subsets, an odd numbered subset (ground-side wireless power transfer devices 301, 303, and 305) and an even numbered subset (ground-side wireless power transfer devices 302, 304, and 306), with each subset having its own inverter. The ground-side wireless power transfer devices 301-306 of the two subsets may be arranged in an interleaved manner, as shown in FIGS. 3A, 4, 5, and 6.

By arranging the ground-side wireless power transfer devices in an interleaved manner, a number of advantages may be achieved. When the system needs maintenance and the ground-side wireless power transfer devices are interleaved, one subset of ground-side wireless power transfer devices 108 may be down, but the other subset may be active and able to provide power to vehicles. For example, if the first ground-side wireless power transfer device 301 is in need of repair, the odd numbered subset (e.g., ground-side wireless power transfer devices 301, 303, and 305) and the first inverter 321 may be deactivated while the first ground-side wireless power transfer device 301 is being repaired. During this time, the even numbered subset (e.g., ground-side wireless power transfer devices 302, 304, and 306) may remain operational and able to provide electrical power to vehicles in the range of the set 102 of ground-side wireless power transfer devices.

Further, when the ground-side wireless power transfer devices are in an interleaved manner, the subsets of ground-side wireless power transfer devices may be selectively activated to even out wear and usage of the ground-side wireless power transfer devices of the set. For example, if the even numbered ground-side wireless power transfer devices of FIG. 3A (e.g., 302, 304, and 306) were used more frequently than the odd numbered ground-side wireless power transfer devices (e.g., 301, 303, and 305), the next time a vehicle is detected in the range of the ground-side wireless power transfer devices, the odd numbered ground-side wireless power transfer devices may be used.

Each subset of ground-side wireless power transfer devices is connected to a respective inverter, resulting in two inverters for the set of ground-side wireless power transfer devices. As shown in FIG. 3A, the odd numbered subset is connected to a first inverter 321, and the even numbered subset is connected to a second inverter 322. This is in contrast with the sets 102A and 102B shown in FIG. 2, which each have one inverter 206 per set 102.

The first inverter 321 converts low-frequency AC power received from the AC grid 360 to high-frequency AC power and provides the high-frequency AC power to the odd numbered subset of ground-side wireless power transfer devices. The second inverter 322 converts low-frequency AC power received from the AC grid 360 to high-frequency AC power and provides the high-frequency AC power to the even numbered subset of ground-side wireless power transfer devices.

When the vehicle position sensor (e.g., antenna 350) detects the presence of a vehicle in the range of the set 102, as described herein, the vehicle position sensor (e.g., antenna 350) communicates an indication to the switch driver 340 that a vehicle is within the range.

The switch driver 340 receives the indication that a vehicle is within the range and determines whether to open or close the first switch 331 and whether to open or close the second switch 322. When the first switch is in the open position, electrical power does not flow to the odd numbered subset of ground-side wireless power transfer devices, and when the first switch is in the closed position, electrical power flows to the odd numbered subset of ground-side wireless power transfer devices. Similarly, when the second switch is in the open position, electrical power does not flow to the even numbered subset of ground-side wireless power transfer devices, and when the second switch is in the closed position, electrical power flows to the even numbered subset of ground-side wireless power transfer devices.

The switch driver 340 may communicate instructions to the first switch 331 and the second switch 332 such that only the first switch 331 is in the closed position, only the second switch 332 is in the closed position, both the first switch 331 and the second switch 332 are in the open position, or both the first switch 331 and the second switch 332 are in the closed position.

Figure 3B:
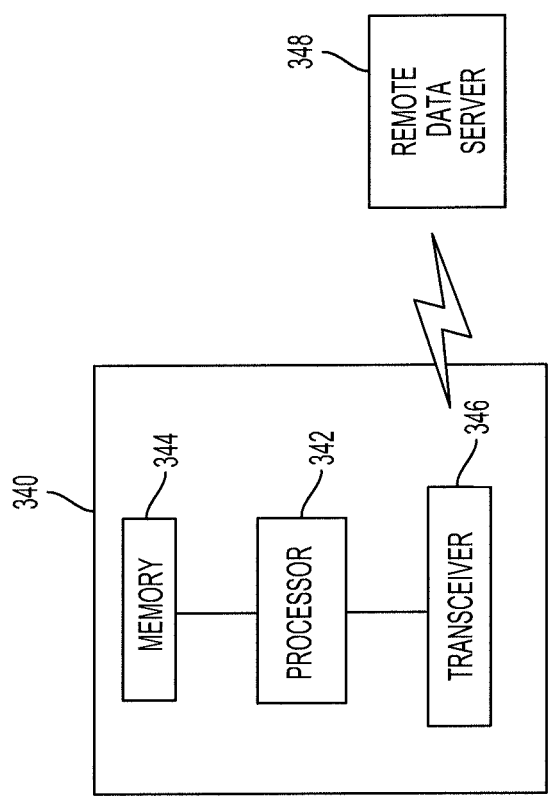
FIG. 3B illustrates a switch driver, according to various embodiments of the invention.

FIG. 3B illustrates the switch driver 340 of FIG. 3A. The switch driver 340 of FIG. 3B may also be used as the switch driver 210 of FIG. 2. The switch driver 340 includes a processor 342 configured to execute instructions stored on a non-transitory memory 344. Any of the actions of the switch driver 340 described herein may be performed by the processor 342. The switch driver 340 also includes a transceiver 346 communicatively coupled to a remote data server 348. The remote data server 348 may be a source of traffic data, location data, environmental data, topographical data, map data, and any other data pertinent to the usage of the ground-side wireless power transfer devices. The transceiver 346 may be configured to communicate data over a wireless data network, such as a cellular network or Wi-Fi network.

The switch driver 340 may store in the memory 344 a count of the usage of each subset of ground-side wireless power transfer devices, and the switch driver 340 may determine which switch to open and which switch to close based on the usages. In some embodiments, the switch driver 340 may level out the usage of each subset. In some embodiments, the switch driver 340 may be aware of an imminent planned maintenance of a particular subset and leading up to the planned maintenance, the particular subset may be used more often than the other subset(s), as it is going to be maintained imminently.

The switch driver 340 may receive traffic data from the remote data server 348 via the transceiver 346. When the traffic data indicates that there is heavy traffic in the range of the ground-side wireless power transfer devices of the set 102, the switch driver 340 may move all of the switches to the closed position when a vehicle is in the range, such that all of the subsets of ground-side wireless power transfer devices are activated and able to transmit electrical power. When the traffic data indicates that there is sparse traffic in the range of the ground-side wireless power transfer devices of the set 102, the switch driver 340 may only move one of the switches to the closed position, such that only one of the subsets of ground-side wireless power transfer devices are activated and able to transmit electrical power to a vehicle within the range.

The switch driver 340 may receive road closure data from the remote data server 348 via the transceiver 346, and when the road closure data indicates that the road corresponding to the set of the ground-side wireless power transfer devices is closed, the switch driver 340 may move all switches to the open position, such that no energy is wasted.

The memory 344 may store a time-out period of time. The switch driver 340 may move all switches to the open position after the time-out period of time has elapsed. The time-out period of time may begin being counted after a vehicle is detected as being within the range of the set 102 of ground-side wireless power transfer devices. The time-out period of time may be set to a value where any vehicles travelling in the range of the set 102 of ground-side wireless power transfer devices would likely have exited the range of the set 102 of ground-side wireless power transfer devices within the time-out period of time.

In some embodiments, the time-out period of time may be predetermined based on the location of the set 102 of ground-side wireless power transfer devices and the spacing of the ground-side wireless power transfer devices from each other. In some embodiments, the time-out period of time may be adjusted dynamically based on received data, such as traffic data or weather data. For example, when traffic is heavy, the time-out period of time may be lengthened, and when the weather is such that vehicles can be expected to travel slower (e.g., snow or rain), the time-out period of time may also be lengthened.

The switch driver 340 may receive weather data from the remote data server 348 via the transceiver 346, and when the weather data indicates conditions where vehicles may be expected to travel slower or vehicles may be expected to use more electrical energy, all of the subsets of ground-side wireless power transfer devices may be activated by moving all of the switches to the closed position.

The vehicle transceiver 116 may communicate vehicle data to the vehicle position sensor. The vehicle data may include a battery level or an electrical charge demand of the vehicle. The switch driver 340 may receive vehicle related data from the vehicle position sensor and activate a number of subsets of ground-side wireless power transfer devices accordingly. For example, when the vehicle data indicates that the vehicle 104 is very low on electrical power, more subsets of ground-side wireless power transfer devices may be activated. In another example, when the vehicle data indicates that the vehicle 104 is one that uses a relatively high amount of electrical energy, such as a big rig truck or a bus, more subsets of ground-side wireless power transfer devices may be activated.

In some situations, a fee may be associated with use of the ground-side wireless power transfer devices to charge the vehicle 104, and a payment amount, use count, or usage permissions may be communicated as part of the vehicle data. The switch driver 340 may activate subsets of the ground-side wireless power transfer devices based on account information associated with the vehicle 104. For example, different usage plans may be associated with use of the ground-side wireless power transfer devices, and under a first usage plan, the vehicle 104 may receive charge from all of the available subsets of ground-side wireless power transfer devices, and under a second usage plan, the vehicle 104 may receive charge from only a portion of the available subsets of ground-side wireless power transfer devices.

While two subsets are shown in FIG. 3A, any number of subsets and corresponding inverters may be used. In addition, any combination of the subsets may be used in the situations described herein. For example, when heavy traffic is detected, instead of all of the switches being moved to the closed position, as described herein, more switches than normal may be moved to the closed position. Further, while the subsets of FIG. 3A are shown as being alternating in arrangement (e.g., A, B, A, B, A, B), any arrangement may be used (e.g., A, B, C, D, C, B, A, B, C, D or A, B, C, D, A, B, C, D), where the letters represent different subsets of ground-side wireless power transfer devices controlled by different switches.

Figure 4:
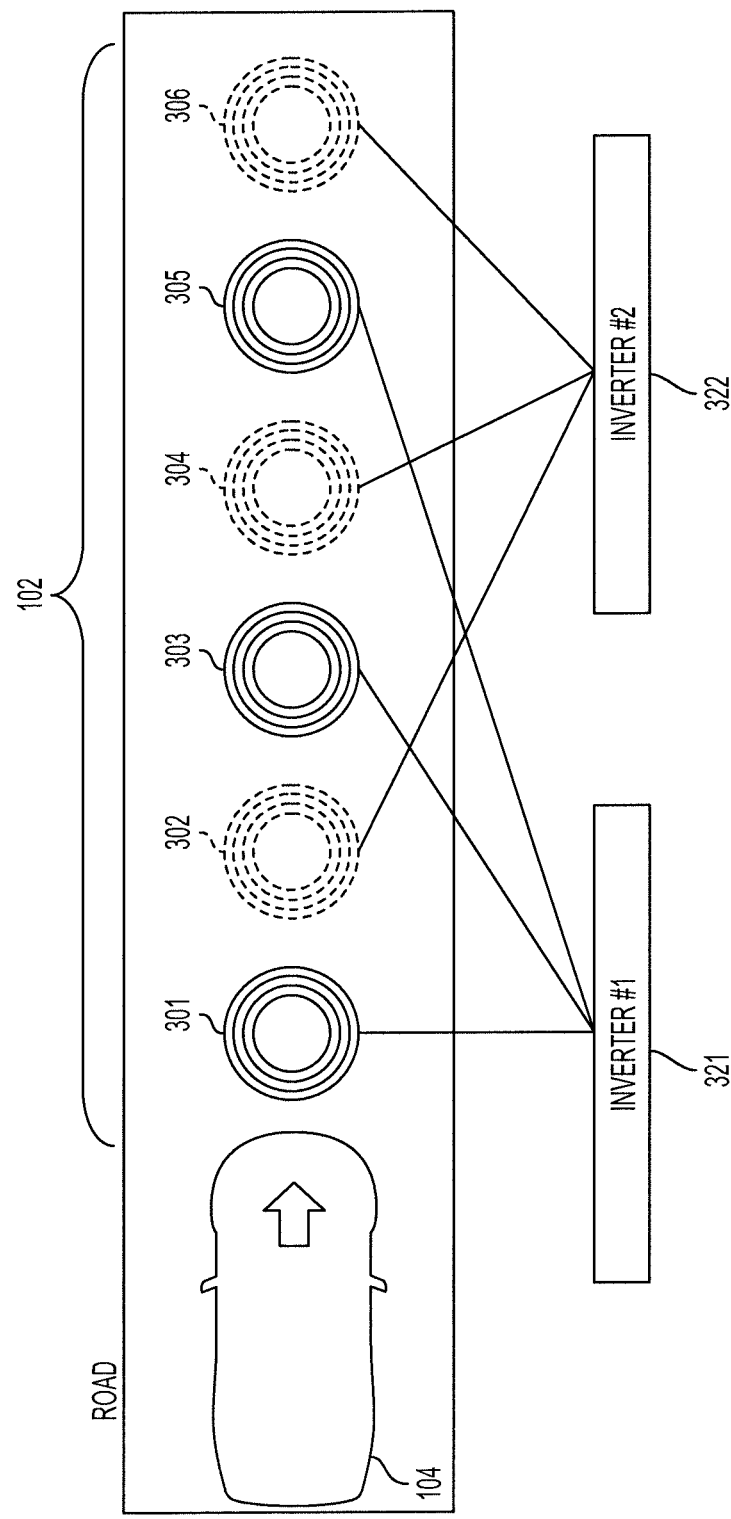
FIG. 4 illustrates an example scenario where only a first subset of ground-side wireless power transfer devices are activated, according to various embodiments of the invention.

FIG. 4 illustrates an example scenario where only a first subset of ground-side wireless power transfer devices are activated.

The vehicle 104 is within the range of the set 102 of ground-side wireless power transfer devices 301-306. The ground-side wireless power transfer devices 301-306 are separated into two subsets: an odd-numbered subset (ground-side wireless power transfer devices 301, 303, 305) and an even-numbered subset (ground-side wireless power transfer devices 302, 304, 306). The odd-numbered subset is connected to a first inverter 321 and the even-numbered subset is connected to a second inverter 322, similar to FIG. 3A.

The vehicle 104 has been detected by the system, using the vehicle position sensor (e.g., an antenna, a weight sensor, a movement detection sensor, or a camera). The switch driver 340 has determined that the odd-numbered subset should be used, according to any of the steps/criteria described herein. The first switch (switch 331 of FIG. 3A) is moved from the open position to the closed position, and the ground-side wireless power transfer devices 301, 303, and 305 are activated (as shown by the solid lines) and capable of automatically transmitting electrical power wirelessly to the vehicle 104. The second switch (switch 332 of FIG. 3B) remains in the open position or is moved from the closed position to the open position, and the ground-side wireless power transfer devices 302, 304, and 306 are not activated (as shown by the dashed lines).

Figure 5:
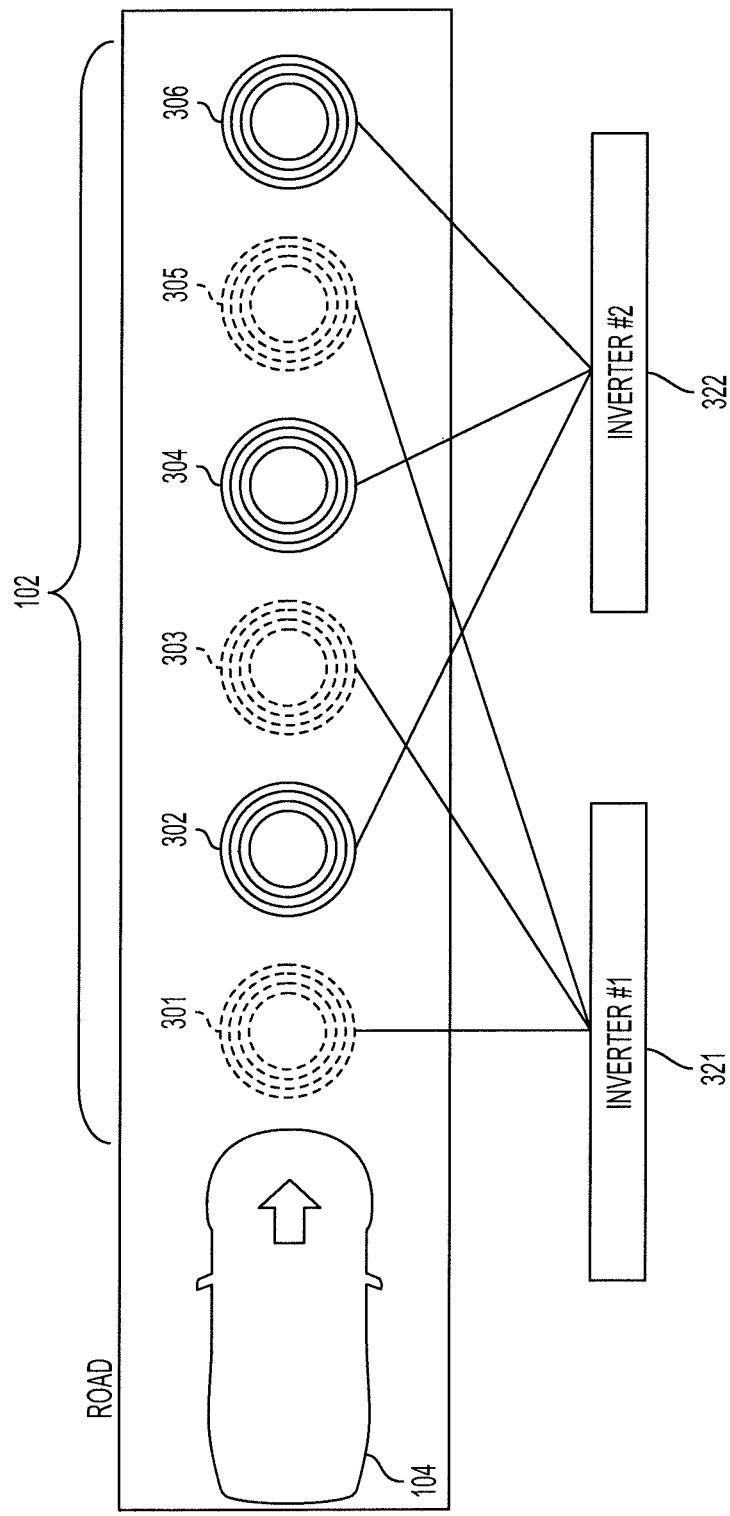
FIG. 5 illustrates a second subset of ground-side wireless power transfer devices being used by the vehicle, according to various embodiments of the invention.

FIG. 5 illustrates a second subset of ground-side wireless power transfer devices being used by the vehicle 104.

Again, the vehicle 104 may be detected by the system, using the vehicle position sensor. The switch driver 340 has, in this case, determined that the even-numbered subset should be used, according to any of the steps/criteria described herein. The second switch (switch 332 of FIG. 3A) is moved from the open position to the closed position, and the ground-side wireless power transfer devices 302, 304, and 306 are activated (as shown by the solid lines) and capable of automatically transmitting electrical power wirelessly to the vehicle 104. The first switch (switch 331 of FIG. 3B) remains in the open position or is moved from the closed position to the open position, and the ground-side wireless power transfer devices 301, 303, and 305 are not activated (as shown by the dashed lines).

Figure 6:
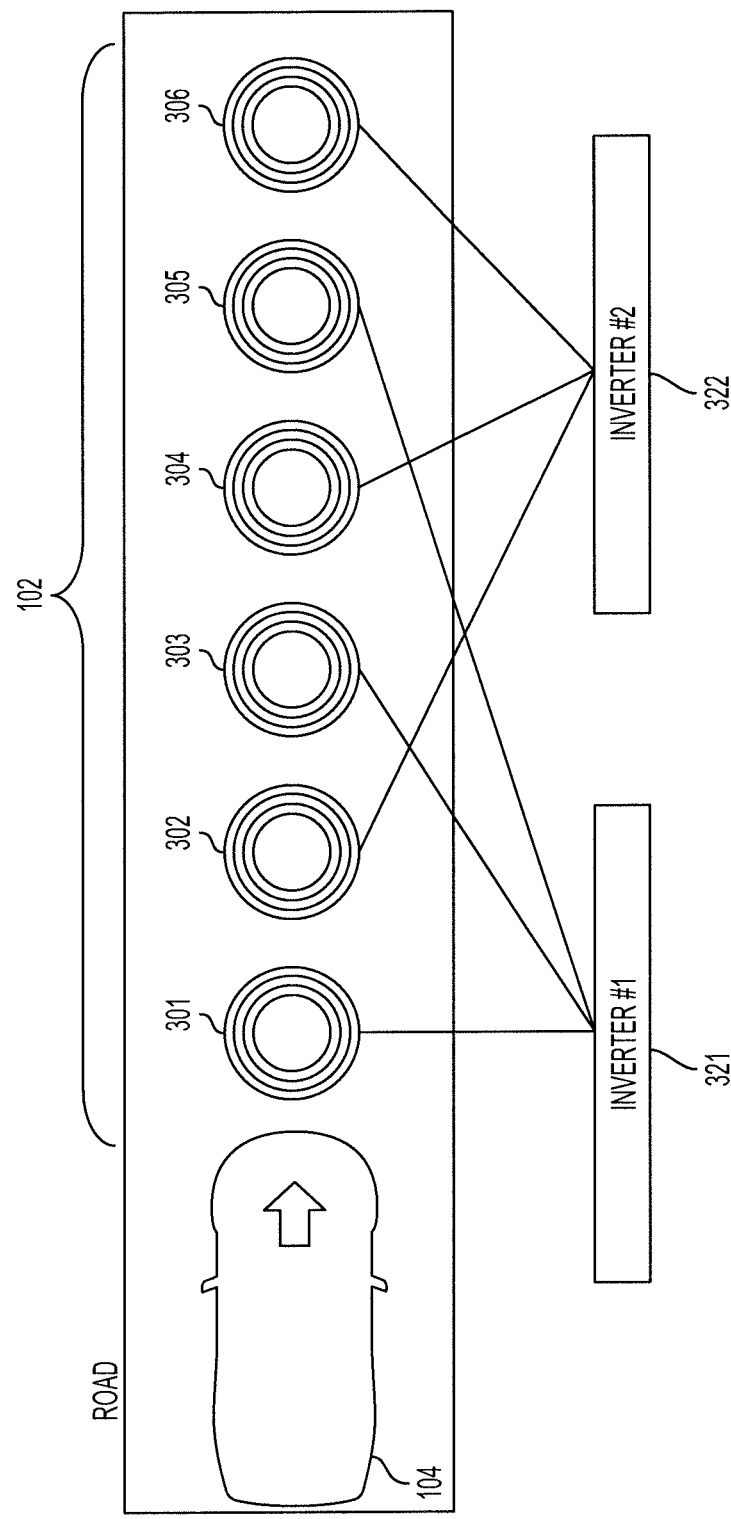
FIG. 6 illustrates all subsets of ground-side wireless power transfer devices being used by the vehicle, according to various embodiments of the invention.

FIG. 6 illustrates all subsets of ground-side wireless power transfer devices being used by the vehicle 104.

Again, the vehicle 104 may be detected by the system, using the vehicle position sensor. The switch driver 340 has, in this case, determined that both the odd-numbered subsets and the even-numbered subset should be used, according to any of the steps/criteria described herein. The first switch (switch 331 of FIG. 3A) and the second switch (switch 332 of FIG. 3A) is moved from the open position to the closed position, and the ground-side wireless power transfer devices 301-306 are activated (as shown by the solid lines) and capable of automatically transmitting electrical power wirelessly to the vehicle 104.

Figure 7:
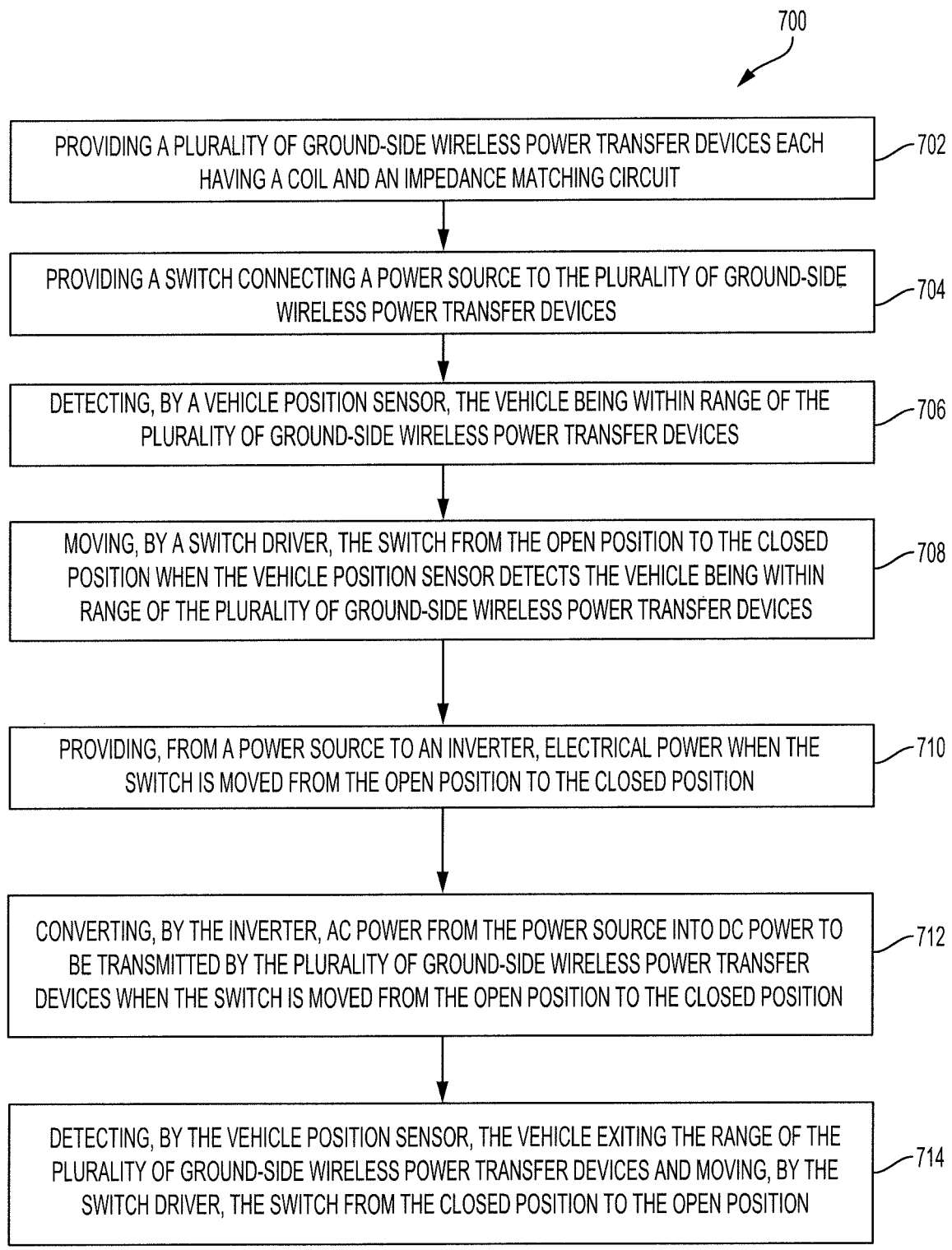
FIG. 7 illustrates a flowchart of a process of the system, according to various embodiments of the invention.

FIG. 7 is a flowchart of a process 700 of the system, according to some embodiments of the invention.

A plurality of ground-side wireless power transfer devices 108 each having a coil 202 and an impedance matching circuit 204 are provided (step 702). The plurality of ground-side wireless power transfer devices 108 may be positioned within a ground surface of the road such that vehicles drive over the ground-side wireless power transfer devices 108. As described herein, the plurality may be a set 102 of ground-side wireless power transfer devices 108. Each ground-side wireless power transfer device 108 is configured to automatically provide power to a counterpart vehicle-side wireless power transfer device 124.

A switch connecting a power source to the plurality of ground-side wireless power transfer devices and configured to be in an open position or a closed position is provided (step 704). The switch may also be located within the ground surface of the road, or may be located on the side of the road.

A vehicle position sensor detects the vehicle 104 being within the range of the plurality of ground-side wireless power transfer devices 108 (step 706). As described herein, the vehicle position sensor may be an antenna 114, a weight sensor 118, a movement detection sensor 120, or an image sensor, such as a camera.

A switch driver 210 connected to the vehicle position sensor and the switch 208 moves the switch 208 from the open position to the closed position when the vehicle position sensor detects the vehicle 104 being within range of the plurality of ground-side wireless power transfer devices 108 (step 708). The switch driver 210 also moves the switch 208 from the closed position to the open position when the vehicle position sensor does not detect the vehicle 104 being within the range of the plurality of ground-side wireless power transfer devices 108 (step 708).

Electrical power from a power source is provided to an inverter 206 when the switch 208 is moved from the open position to the closed position (step 710). The inverter 206 converts low-frequency AC power from the power source into high-frequency AC power to be transmitted by the plurality of ground-side wireless power transfer devices 108 when the switch 208 is moved from the open position to the closed position (step 712).

The vehicle position sensor may detect the vehicle 104 exiting the range of the plurality of ground-side wireless power transfer devices 108 and the switch driver 210 moves the switch 208 from the closed position to the open position (step 714).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for wirelessly providing power to a vehicle, the system comprising:
   a plurality of ground-side wireless power transfer devices each having a coil and an impedance matching circuit, each ground-side wireless power transfer device configured to automatically provide power to a counterpart vehicle-side wireless power transfer device;
   a switch connecting a power source to the plurality of ground-side wireless power transfer devices and configured to be in an open position or a closed position;
   a vehicle position sensor configured to detect the vehicle being within range of the plurality of ground-side wireless power transfer devices and detect the vehicle exiting the range of the plurality of ground-side wireless power transfer devices; and
   a switch driver connected to the vehicle position sensor and the switch and configured to move the switch from the open position to the closed position when the vehicle position sensor detects the vehicle being within range of the plurality of ground-side wireless power transfer devices, and move the switch from the closed position to the open position when the vehicle position sensor detects the vehicle exiting the range of the plurality of ground-side wireless power transfer devices or when the vehicle position sensor does not detect the vehicle being within range of the plurality of ground-side wireless power transfer devices.

2. The system of claim 1, further comprising an inverter connected to the plurality of ground-side wireless power transfer devices and the switch, the inverter configured to convert low-frequency AC power from the power source into high-frequency AC power to be transmitted by the plurality of ground-side wireless power transfer devices.

3. The system of claim 1, wherein the vehicle position sensor is an antenna configured to receive vehicle position data from a transceiver of the vehicle, the vehicle position data indicating a location of the vehicle.

4. The system of claim 1, wherein the vehicle position sensor is a weight sensor configured to detect when the vehicle enters the range of the plurality of ground-side wireless power transfer devices.

5. The system of claim 1, wherein the vehicle position sensor is a movement detection sensor configured to detect when the vehicle enters the range of the plurality of ground-side wireless power transfer devices.

6. The system of claim 1, wherein the switch driver is further configured to determine an anticipated arrival time of the vehicle to the range of the plurality of ground-side wireless power transfer devices, and wherein the switch driver moves the switch from the open position to the closed position based on the determined anticipated arrival time of the vehicle.

7. A system for wirelessly providing power to a vehicle, the system comprising:

a first plurality of ground-side wireless power transfer devices;

a second plurality of ground-side wireless power transfer devices, each ground-side wireless power transfer device from the first plurality of ground-side wireless power transfer devices and the second plurality of ground-side wireless power transfer devices having a coil and an impedance matching circuit and being configured to automatically provide power to a counterpart vehicle-side wireless power transfer device, the first plurality of ground-side wireless power transfer devices and the second plurality of ground-side wireless power transfer devices arranged in an interleaved pattern along a surface to be traversed by the vehicle;

a first switch connecting a power source to the first plurality of ground-side wireless power transfer devices and configured to be in an open position or a closed position;

a second switch connecting the power source to the second plurality of ground-side wireless power transfer devices and configured to be in an open position or a closed position;

a vehicle position sensor configured to detect the vehicle being within range of the first plurality of ground-side wireless power transfer devices and the second plurality of ground-side wireless power transfer devices; and a switch driver configured to:

move at least one of the first switch or the second switch from the open position to the closed position when the vehicle position sensor detects the vehicle being within range of the first plurality of ground-side wireless power transfer devices and the second plurality of ground-side wireless power transfer devices, and move at least one of the first switch or the second switch from the closed position to the open position when the vehicle position sensor does not detect the vehicle being within range of the first plurality of ground-side wireless power transfer devices and the second plurality of ground-side wireless power transfer devices.

8. The system of claim 7, further comprising:

a first inverter connected to the first plurality of ground-side wireless power transfer devices and the first switch, the first inverter configured to convert low-frequency AC power from the power source into high-frequency AC power to be transmitted by the first plurality of ground-side wireless power transfer devices; and a second inverter connected to the second plurality of ground-side wireless power transfer devices and the second switch, the second inverter configured to convert low-frequency AC power from the power source into high-frequency AC power to be transmitted by the second plurality of ground-side wireless power transfer devices.

9. The system of claim 7, wherein the vehicle position sensor is an antenna configured to receive vehicle position data from a transceiver of the vehicle, the vehicle position data indicating a location of the vehicle.

10. The system of claim 7, wherein the vehicle position sensor is a weight sensor configured to detect when the vehicle enters the range of the first plurality of ground-side wireless power transfer devices and the second plurality of ground-side wireless power transfer devices.

11. The system of claim 7, wherein the vehicle position sensor is a movement detection sensor configured to detect when the vehicle enters the range of the first plurality of ground-side wireless power transfer devices and the second plurality of ground-side wireless power transfer devices.

12. The system of claim 7, wherein the vehicle position sensor is further configured to detect the vehicle exiting the range of the first plurality of ground-side wireless power transfer devices and the second plurality of ground-side wireless power transfer devices, and wherein the switch driver is further configured to move at least one of the first switch or the second switch from the closed position to the open position when the vehicle position sensor detects the vehicle exiting the range of the first plurality of ground-side wireless power transfer devices and the second plurality of ground-side wireless power transfer devices.

13. The system of claim 7, wherein the switch driver includes a memory configured to store a number of uses of the first plurality of ground-side wireless power transfer devices and a number of uses of the second plurality of ground-side wireless power transfer devices, and wherein the switch driver is configured to move at least one of the first switch or the second switch from the open position to the closed position based on the number of uses of the first plurality of ground-side wireless power transfer devices and the number of uses of the second plurality of ground-side wireless power transfer devices.

14. The system of claim 7, wherein the switch driver includes a transceiver configured to receive traffic data from a remote data server, and wherein the switch driver is configured to move the first switch or the second switch from the open position to the closed position, or move the first switch and the second switch from the open position to the closed position based on the traffic data.

15. The system of claim 7, wherein the switch driver includes a transceiver configured to receive weather data from a remote data server, and wherein the switch driver is configured to move the first switch or the second switch from the open position to the closed position, or move the first switch and the second switch from the open position to the closed position based on the weather data.

16. The system of claim 7, wherein the switch driver is configured to move the first switch from the open position to the closed position when the vehicle position sensor detects the vehicle being within range of the first plurality of ground-side wireless power transfer devices and the second plurality of ground-side wireless power transfer devices and when the second plurality of ground-side wireless power transfer devices are inoperable, and wherein the switch driver is configured to move the second switch from the open position to the closed position when the vehicle position sensor detects the vehicle being within range of the first plurality of ground-side wireless power transfer devices and the second plurality of ground-side wireless power transfer devices and when the first plurality of ground-side wireless power transfer devices are inoperable.

17. The system of claim 7, wherein the switch driver is further configured to determine an anticipated arrival time of the vehicle to the range of the first plurality of ground-side wireless power transfer devices and the second plurality of ground-side wireless power transfer devices, and wherein the switch driver moves at least one of the first switch or the second switch from the open position to the closed position based on the determined anticipated arrival time of the vehicle.

18. The system of claim 7, wherein the switch driver is further configured to automatically move the first switch and the second switch from the closed position to the open position when a predetermined period of time has elapsed.

19. A system for wirelessly providing power to a vehicle, the system comprising:

a plurality of ground-side wireless power transfer devices each having a coil and an impedance matching circuit, each ground-side wireless power transfer device configured to automatically provide power to a counterpart vehicle-side wireless power transfer device;

a switch connecting a power source to the plurality of ground-side wireless power transfer devices and configured to be in an open position or a closed position;

a vehicle position sensor configured to detect the vehicle being within range of the plurality of ground-side wireless power transfer devices; and a switch driver connected to the vehicle position sensor and the switch and configured to move the switch from the open position to the closed position when the vehicle position sensor detects the vehicle being within range of the plurality of ground-side wireless power transfer devices, and automatically move the switch from the closed position to the open position when the vehicle position sensor does not detect the vehicle being within range of the plurality of ground-side wireless power transfer devices or when a predetermined period of time has elapsed.

* * * * *